United States Patent [19]

Munson

[11] Patent Number: 5,752,076

[45] Date of Patent: May 12, 1998

[54] DYNAMIC PROGRAMMING OF BUS MASTER CHANNELS BY INTELLIGENT PERIPHERAL DEVICES USING COMMUNICATION PACKETS

[75] Inventor: Bill A. Munson, Portland, Oreg.

[73] Assignee: Intel Corporation, Santa Clara, Calif.

[21] Appl. No.: 522,177

[22] Filed: Aug. 31, 1995

[51] Int. Cl.$^6$ .............................. G06F 13/14; H04J 3/02
[52] U.S. Cl. .............................. 395/825; 395/824
[58] Field of Search .................. 395/478, 821, 395/822, 823, 824, 825, 872; 370/94.1, 105.1, 105.2, 402

[56] References Cited

U.S. PATENT DOCUMENTS

| | | | |
|---|---|---|---|
| 4,719,621 | 1/1988 | May | 370/402 |
| 5,003,465 | 3/1991 | Chisholm et al. | 395/845 |
| 5,136,584 | 8/1992 | Hedlund | 370/94.1 |
| 5,210,749 | 5/1993 | Firoozmand | 370/463 |
| 5,283,883 | 2/1994 | Mishler | 395/853 |
| 5,381,538 | 1/1995 | Amini et al. | 395/483 |
| 5,440,698 | 8/1995 | Sindhu et al. | 395/200.08 |
| 5,442,389 | 8/1995 | Blahut et al. | 348/7 |
| 5,448,558 | 9/1995 | Gildea et al. | 370/60 |
| 5,450,551 | 9/1995 | Amini et al. | 395/299 |
| 5,475,854 | 12/1995 | Thomsen et al. | 395/800 |
| 5,499,385 | 3/1996 | Farmwald et al. | 395/823 |
| 5,561,820 | 10/1996 | Bland et al. | 395/847 |

*Primary Examiner*—Tod R. Swann
*Assistant Examiner*—Christopher S. Chow
*Attorney, Agent, or Firm*—Blakely, Sokoloff, Taylor & Zafman

[57] ABSTRACT

An controller for allowing any of a plurality of peripheral devices to dynamically program read and write operations upon a memory. A peripheral device initiates a memory operation by transmitting a plurality of packets of information to the controller which has an interface with the memory. One of the packets includes a read/write bit identifying the memory operation as a read operation or a write operation. Each of the packets is an address packet, a data packet, or a control packet. Each of the packets includes a plurality of packet type bits which identify the type of the packet. The controller has circuitry for decoding and executing the memory operation based on the packet type bits and the read/write bit. A FIFO having a multiplexed input is provided in the controller for storing packets received from the peripheral devices and data read from the memory.

49 Claims, 6 Drawing Sheets

5,752,076

DYNAMIC PROGRAMMING OF BUS MASTER CHANNELS BY INTELLIGENT PERIPHERAL DEVICES USING COMMUNICATION PACKETS

FIELD OF THE INVENTION

The present invention pertains to the field of personal computer systems. More particularly, the present invention relates to the programming of memory read and write operations by peripheral devices in a personal computer system.

BACKGROUND OF THE INVENTION

Many personal computer systems make use of direct memory access (DMA) to reduce the burden on the computer system's central processing unit (CPU) when peripheral devices access main memory. DMA allows an "intelligent" peripheral device, such as a disk drive, to access main memory directly, without intervention by the CPU. Generally, a DMA controller is used to perform the read and write operations on main memory for a peripheral device. The DMA controller has interfaces with the CPU, the peripheral device, and main memory. One DMA controller may have several channels for handling memory access by several peripheral devices.

When a peripheral device needs to write to main memory, the CPU programs the DMA controller. In particular, the DMA controller generally has a number of internal registers which the CPU must program, such as a base address register for holding the starting address for the data transfer, and a length register for holding the number of data words to be transferred. Once the DMA controller has been programmed, the DMA controller signals the CPU that it requires control of the bus. When the DMA controller has received control of the bus, it signals the peripheral device to put its data on the bus. The DMA controller then generates an address indicating where in main memory the data is to be written and a signal indicating that data currently available on the bus is to be written into memory. In response, the data is transferred directly from the peripheral device to main memory via the bus. Memory read operations are performed in a similar manner, with the DMA controller generating the appropriate memory addresses.

Existing DMA techniques have certain disadvantages, however. For example, the number of peripheral devices that can be active at one time is limited by the number of channels provided by the DMA controller. Because each channel can support only one peripheral device, the use of large numbers of peripheral devices can become hardware-intensive, costly, and infeasible. Another problem with some existing DMA techniques is that the DMA controller must be programmed by the CPU before each data transfer, as mentioned above. Although DMA generally reduces CPU overhead, the programming of the DMA controller by the CPU for each memory access consumes valuable processor time.

SUMMARY OF THE INVENTION

An apparatus for allowing any of a plurality of peripheral devices to dynamically program read and write operations upon a memory is provided. The apparatus includes means for establishing one of the peripheral devices as a current bus master and means for initiating a memory operation. The means for initiating the memory operation includes means for transmitting a plurality of packets of information to a controller that provides an interface with the memory. One of the packets includes a read/write bit identifying the memory operation as a read operation or a write operation. Each of the packets is one of a plurality of packet types, wherein each of the packets includes a plurality of packet type bits which identify the packet type of the packet. The apparatus further comprises means for decoding the memory operation using the controller based on the packet type bits and the read/write bit, and means for performing the memory operation.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for allowing a plurality of peripheral devices to dynamically program read and write operations on a memory is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
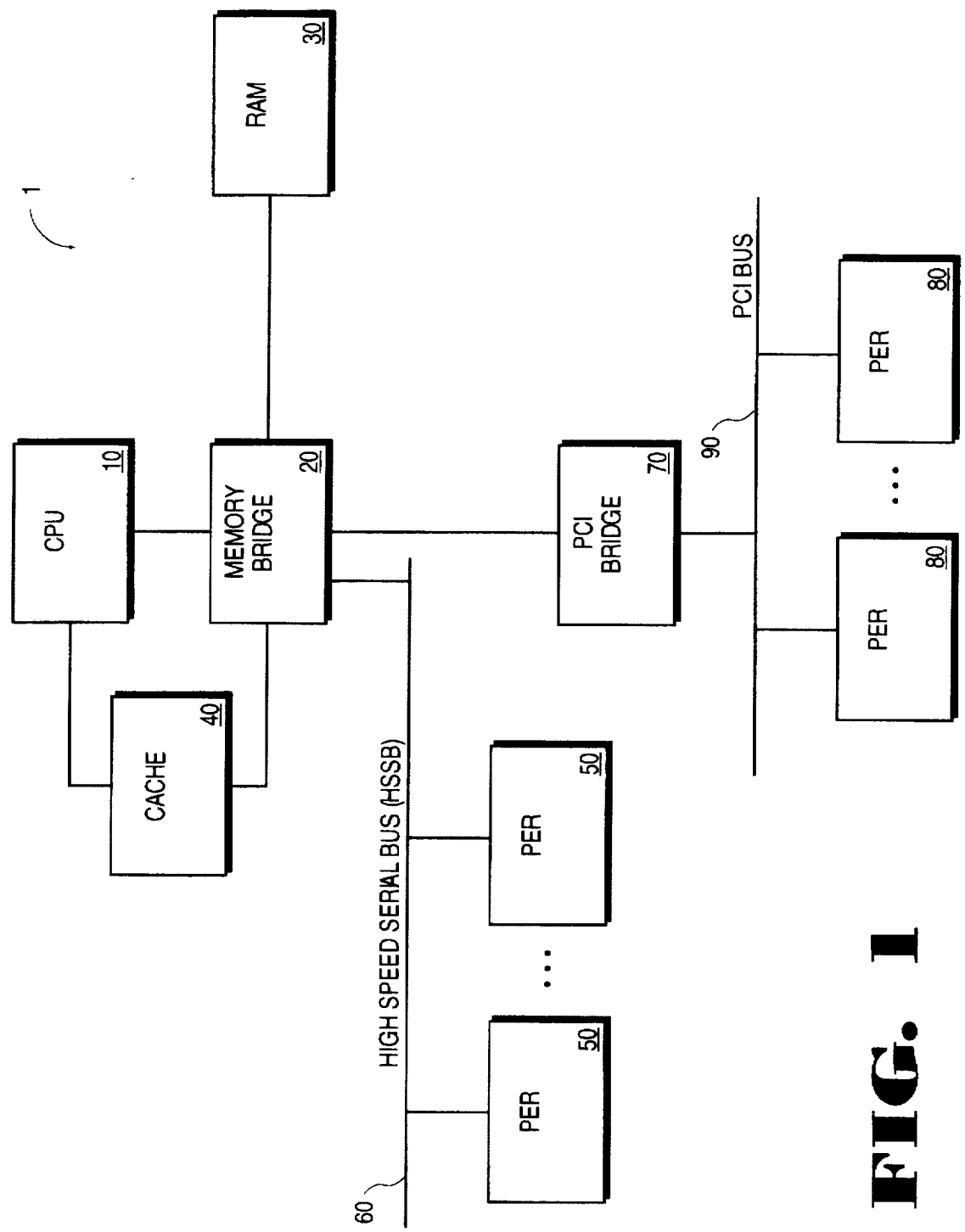
FIG. 1 illustrates a computer system in which the present invention can be implemented.

FIG. 1 illustrates a computer system 1 in which the present invention can be implemented. The computer system 1 comprises a central processing unit (CPU) 10 coupled to cache memory 40 and to a memory bridge 20. The CPU 10 and the cache 40 are coupled to main memory 30 through the memory bridge 20. The computer system 1 also has a Peripheral Component Interconnect (PCI) bus 90 supporting a number of peripheral devices 80. A PCI bridge 70 provides an interface between the PCI bus 90 and the memory bridge 20.

Also coupled to the memory bridge 20 is a high-speed serial bus (HSSB) 60 supporting a number of peripheral devices 50. Each of the peripheral devices 50 may be any of a number of devices requiring high speed data communication, such as hard disk drives, video cameras, printers, and scanners. As will be described in greater detail below, the present invention is directed to allowing the peripheral devices 50 on the HSSB 60 to program direct memory access (DMA) operations upon main memory 30. More specifically, the present invention is directed to allowing the peripheral devices 50 to generate physical memory addresses for read and write operations, such that multiple peripheral devices can share a single DMA channel.

Figure 2:
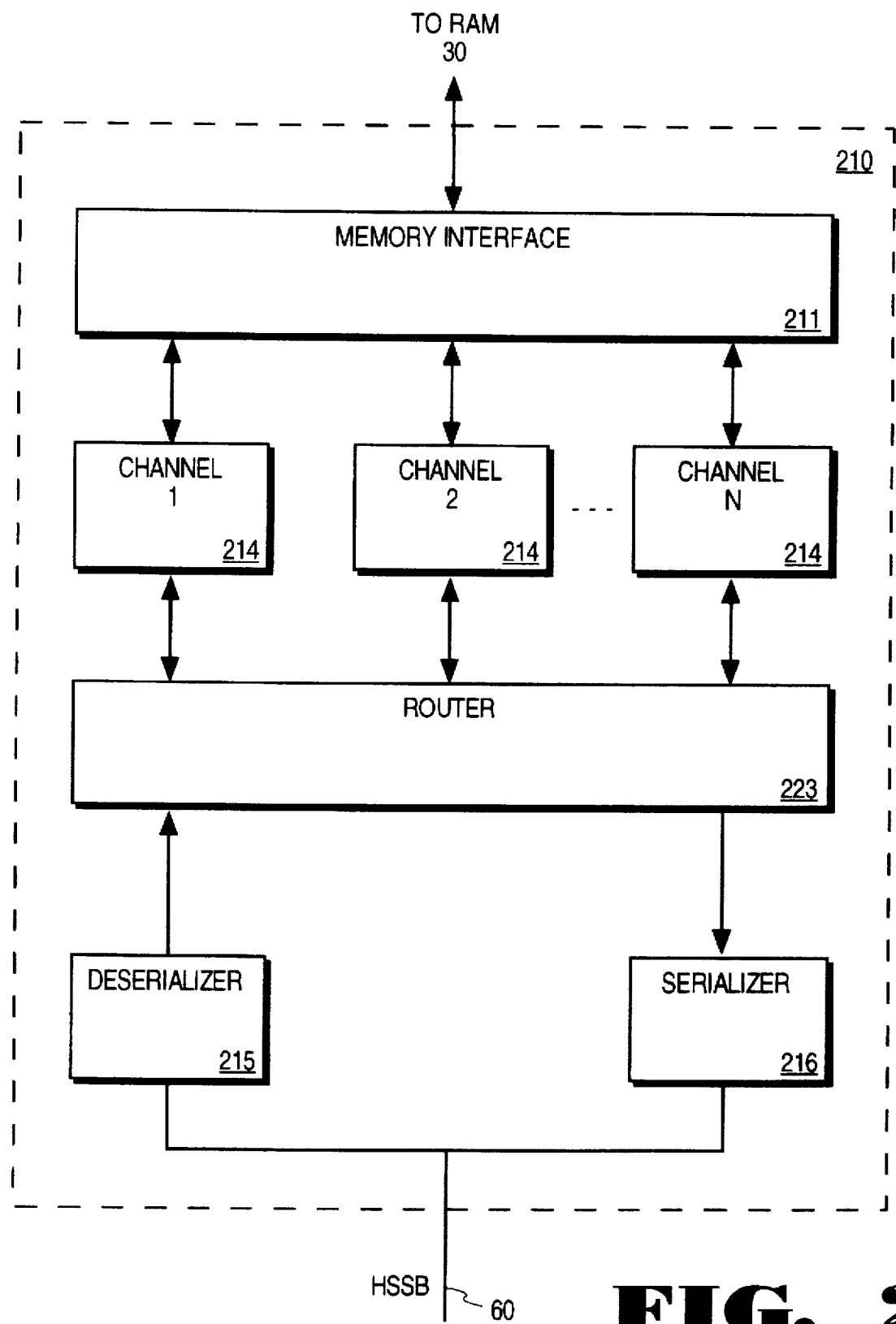
FIG. 2 illustrates a host controller having multiple channels for performing direct memory access in a computer system.

Referring now to FIG. 2, the memory bridge 20 includes a host controller 210 which controls memory accesses by the high-speed peripheral devices 50 and by the CPU 10. The host controller 210 includes a number of identical channels 214, each of which includes hardware for controlling read and write operations on main memory 30 by the peripheral devices 50. Each of the channels 214 may be shared by several of the peripheral devices 50. Peripheral devices 50 transmit and receive high-speed, asynchronous or isochronous serial data on the HSSB 60 to and from the host controller 210, respectively, to initiate memory access operations. A router 223 coupled to each of the channels 214 provides arbitration between the peripheral devices 50 and directs memory access requests from each peripheral device 50 to the proper (assigned) channel 214. The host controller 210 also includes a deserializer 215 and a serializer 216 coupling the router 223 to the HSSB 60, and a memory interface 211 coupling each of the channels 214 to main memory 30. The memory interface 211 provides arbitration between the channels 214. Deserializer 215 converts the high-speed serial data received on the HSSB 60 to parallel data, which is provided to the router 223. Serializer 216 converts parallel data received from the router 223 to high-speed serial data for transmission onto the HSSB 60.

Figure 3:
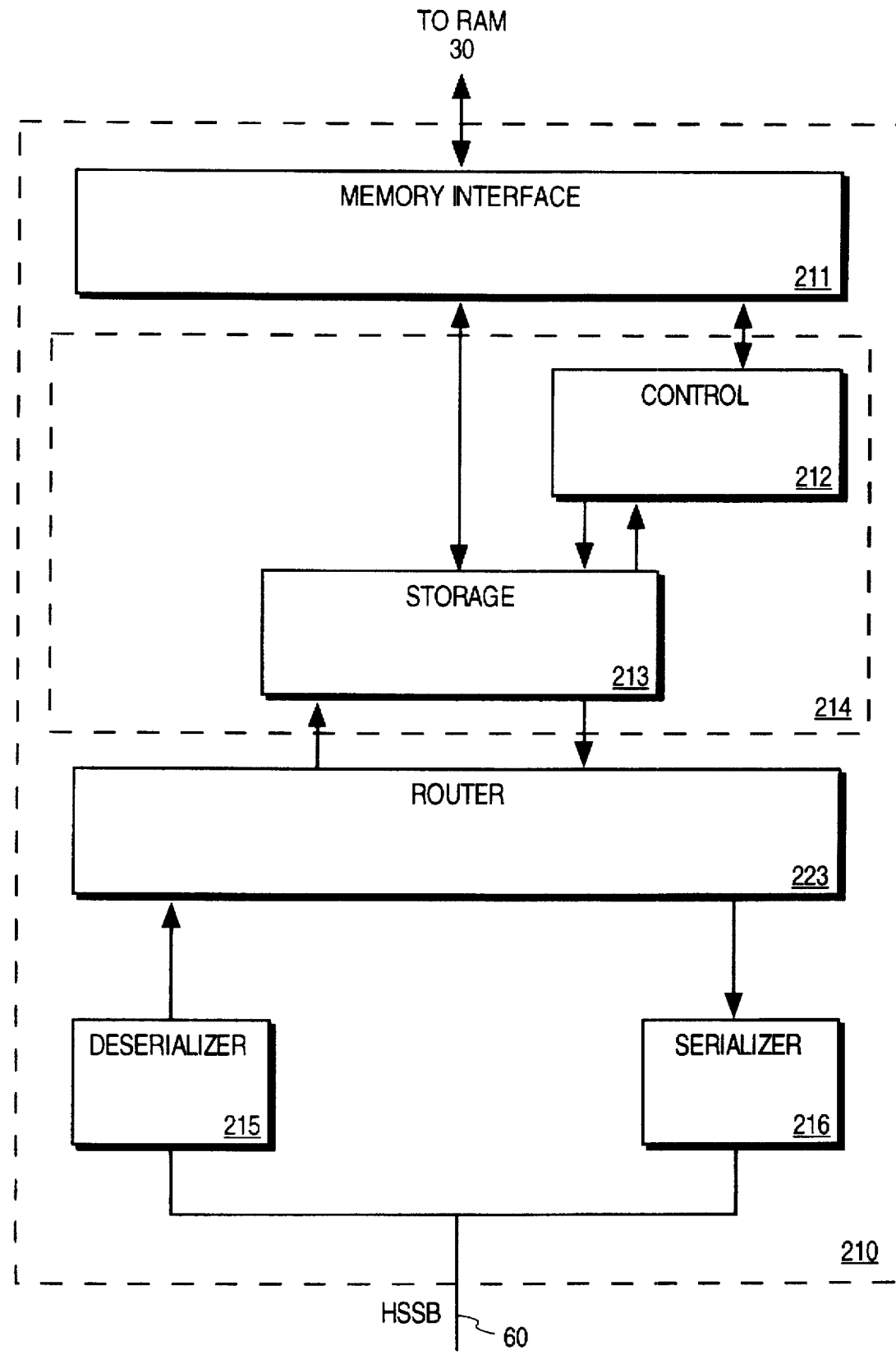
FIG. 3 illustrates a channel for allowing multiple peripheral devices to dynamically reprogram bus master channels.

FIG. 3 shows one of the channels 214 in greater detail. The channel 214 includes storage circuitry 213 coupled to the router 223 and to the memory interface 211, and a control circuit 212 coupled to the storage circuitry 213 and to the memory interface 211. The storage circuitry 213 receives requests for read and write operations from the peripheral devices through the router 223 and outputs those requests to the control circuit 212. During write operations, the storage circuit outputs data which is to be written to main memory 30 through the memory interface 211. During read operations, the storage circuitry 213 receives data read from the main memory 30 through the memory interface 211 and outputs that data to the peripheral devices 50 through the router 223. The control circuit 212 controls the read and write operations by performing memory access cycles upon main memory 30 and by controlling the data flow within the storage circuitry 213.

Figure 4:
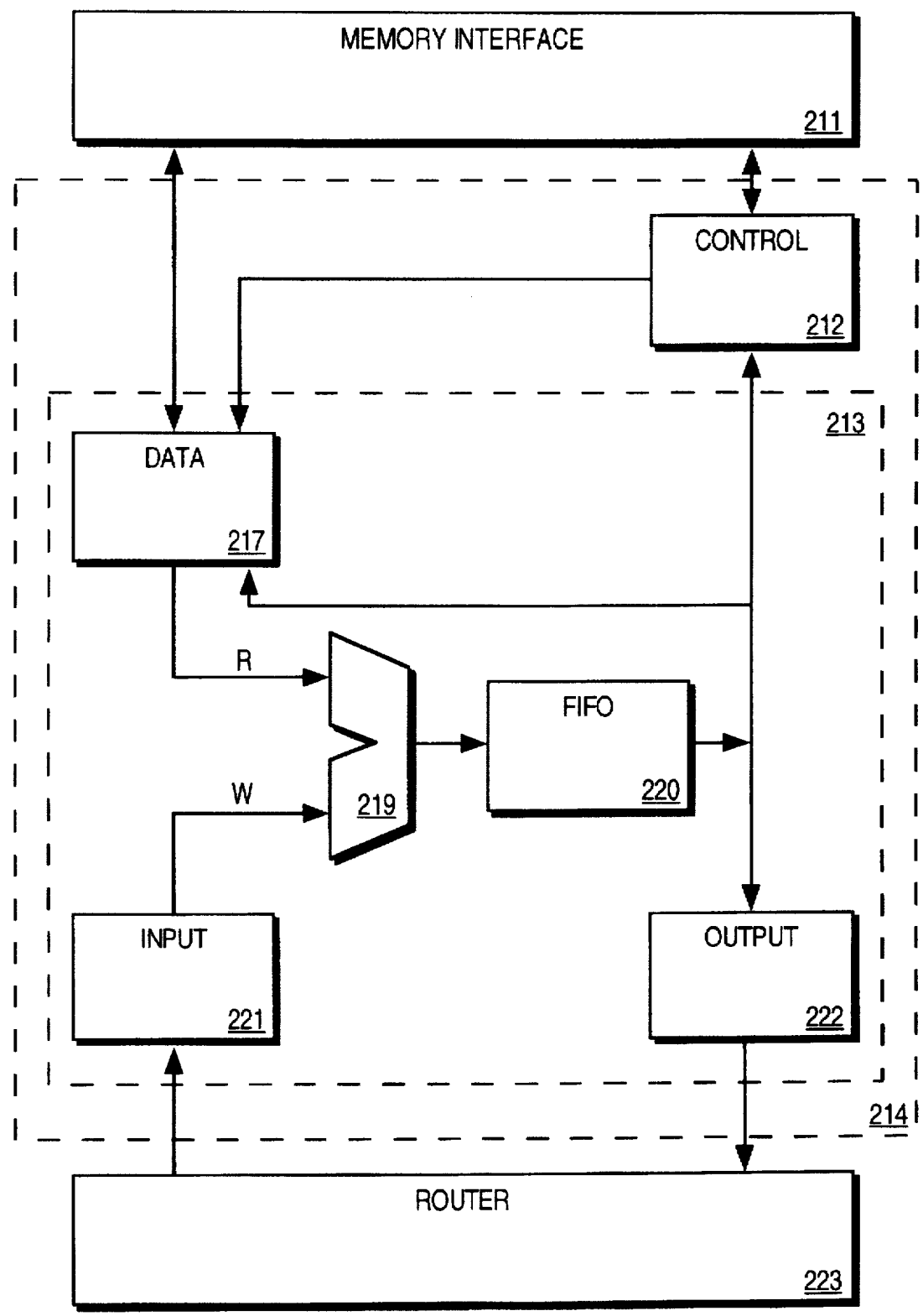
FIGS. 4 illustrates the channel of FIG. 3 in greater detail.

Referring now to FIG. 4, the storage circuitry 213 is illustrated in greater detail. The storage circuitry 213 includes a data buffer 217, a multiplexor 219, a first-in/first-out memory (FIFO) 220, an input buffer 221, and an output buffer 222. The input buffer 221 has an input coupled to the router 223 and an output coupled to a write input W of the multiplexor 219. The data buffer 217 provides storage of data being read from or written to the main memory 30. The data buffer 217 is bi-directionally coupled to the memory interface 211 and has an output coupled to a read input R of the multiplexor 219. The output of the multiplexor 219 is coupled to the input of the FIFO 220. The FIFO 220 has an output coupled to the data buffer 217, to the control circuit 212, and to the output buffer 222. Output buffer 222 has an output coupled to the router 223.

As will be described in detail below, the FIFO provides temporary storage for both memory access requests received from the peripheral devices 50 and for data being read out from main memory 30 during read operations. This dual functionality of the FIFO is implemented by the appropriate selection of either the read input R or the write input W of the multiplexor by the control circuit 212.

Figure 5A:
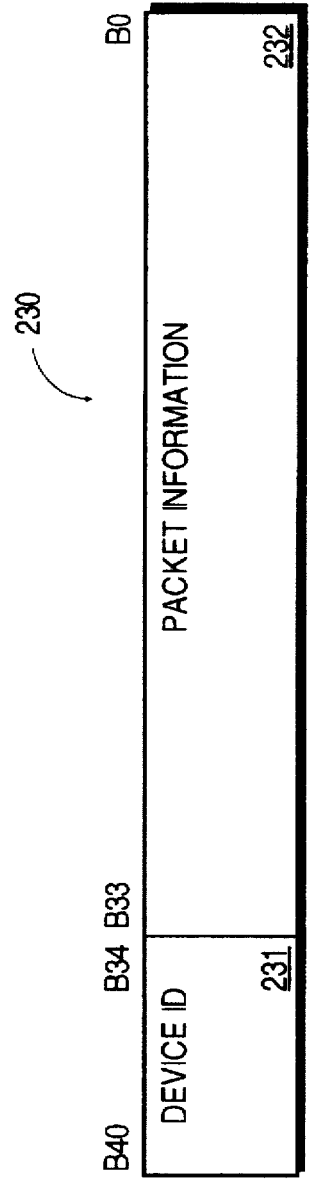
FIGS. 5A and 5B illustrate a packet transmitted by a peripheral device to initiate a memory access operation.
Figure 5B:
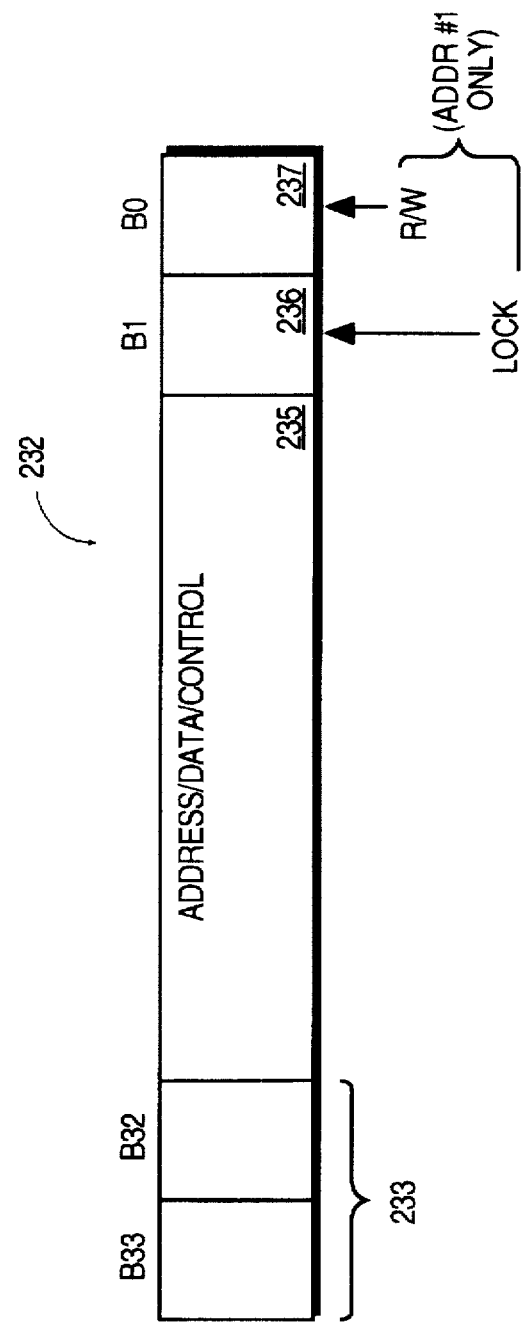

Each read or write operation is initiated by one of the peripheral devices that is assigned to the channel 214 by transmitting two or more packets of serial information onto the HSSB 60, each of which contains address information, control information, or data that is to be written to or read from mains memory 30. Each of the packets 230 has a format which is illustrated in FIGS. 5A and 5B. A packet 230 is 41 bits in length. The upper 7 bits (bits 34 through 40) of the packet 230 are a device identifier (ID) 231 identifying the peripheral device which has transmitted the packet 230. Device IDs 231 are assigned when the peripheral devices are initialized. The lower 34 bits (bits 0 through 33) of the packet 230 constitute packet information 232, which is the above-mentioned addressing information, control information, or data. As illustrated in FIG. 5B, the highest two bits of the packet information 232 (bits 32 and 33) are packet-type bits 233 which identify the packet 230 as an address packet, a data packet, or a control packet, depending upon the nature of the packet information 232. Address packets contain memory addresses. Data packets contain data that is to be written to or read from main memory 30 or the number of words in a read operation. Control packets contain information such as "end-of-transfer" indications, error conditions, or other control information.

To initiate a read or write operation, a peripheral device transmits an address packet followed by one or more control or data packets (or, in some cases, address packets, as will be discussed below). The router 223 receives each deserialized packet and decodes the device ID 231 to determine which of the multiple channels 214 (see FIG. 2) corresponds to the requesting peripheral device. Once the appropriate channel 214 is determined, the 7-bit device ID 231 is stripped off the packet 230. The remaining 34-bit packet (i.e., the packet information 232) is then forwarded to the correct channel 214.

In one embodiment, peripheral devices that share a channel have their device IDs 231 assigned contiguously during initialization by the operating system. Further, the device IDs are aligned on a $2^n$ boundary. Consequently, the router 223 is only required to decode a variable number of upper-order bits of the device IDs 231 in order to determine whether device ID 231 maps to a particular channel 214. The number of upper-order bits which need be decodes depends upon the number of peripheral devices per channel. For example, if there are four peripheral devices per channel (n=2), then it is not necessary for the router 223 to decode the lowest two bits of the device ID 231. The router 223 has a register which stores the device IDs to be decoded and the number of upper-order bits to be checked for each channel. Packets that have a device ID that does not match any of the assigned channel IDs are retransmitted back to the peripherals.

After arbitration for a channel, a peripheral device 50 initiates a read or write operation by transmitting two or more packets 230. The first packet is always an address packet and is designated the "starting address" packet. The lowest 2 bits (bits 0 and 1) of all starting address packets are special-purpose bits. Consequently, all starting addresses are double-word (DWord) -aligned; i.e., bits 0 and 1 of all starting address packets are assumed (for addressing purposes) to be zero. Referring again to FIG. 5B, bit 0 of the starting address is a "read/write" bit 237. The read/write bit 237 indicates to the channel 214 whether a read operation or a write operation is to be performed ("1" indicates read). Bit 2 is a "lock" bit 236. A peripheral device 50 "locks" a channel 214 by setting the lock bit 236 to "1". Locking the channel 214 allows the peripheral device to perform multiple transfers without being subject to rearbitration for use of the channel 214. The peripheral device unlocks the channel once it has finished transferring data by clearing the lock bit 236. It should be noted that bits 0 and 1 of packets other than starting address packets are treated as ordinary packet information.

Figure 6A:
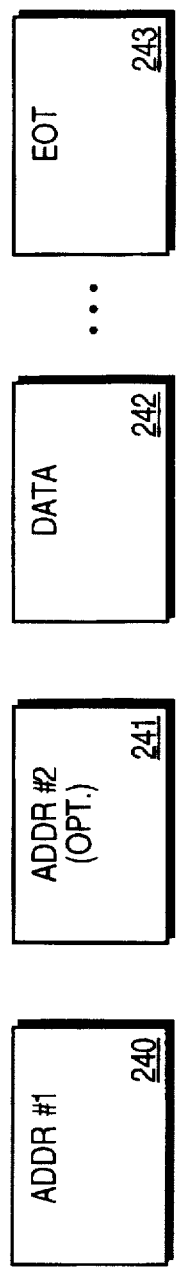
FIGS. 6A illustrates a sequence of packets transmitted by a peripheral device during a write operation.

FIG. 6A illustrates a sequence of packets for performing a write operation on main memory 30. Although all packets are transmitted by a peripheral device with a device ID included, the packets 240 through 243 are shown in FIGS. 5A and 5B without device IDs 231 for descriptive purposes. The peripheral device initiates a write operation by transmitting a starting address packet 240 followed by one or more data packets 242. The data packets include as many DWords of data as the peripheral device needs to write to main memory 30. The sequence ends with an end-of-transfer control packet 243. An optional second address packet 241 may be transmitted following the starting address packet 240 and preceding the data packets 242 if more than 32-bit addressing is required, as will be discussed below. In starting address packet 240, the packet-type bits 233 are set to a combination that indicates that the packet 240 is an address packet. The lock bit 236 is set to "1" to indicate that the channel is locked, and the read/write bit 237 is "0", indicating that a write operation is to be performed. Note that the lock bit 236 and the read/write bit 237 appear only in the starting address packet 240. In each of the data packets 242, the packet-type bits 233 indicate that the packet contains data to be written to or read from main memory 30. The end-of-transfer packet 243, which is identified as a control packet by its packet-type bits 233, indicates the end of the memory write operation. Bytes may be masked during write operations by preceding the data packet 242 with a control packet indicating valid byte lanes.

The present invention allows a peripheral device to write data to non-contiguous blocks of memory without having to lock or rearbitrate for a channel. To write to non-contiguous blocks of memory, a peripheral device sends multiple packet sequences, each consisting of a starting address packet followed by one or more data packets, before sending the end-of-transfer packet 243. Data contained in each group of data packets will automatically be written to the proper block of memory space based on the starting address which immediately precedes that group of data packets.

Figure 6B:
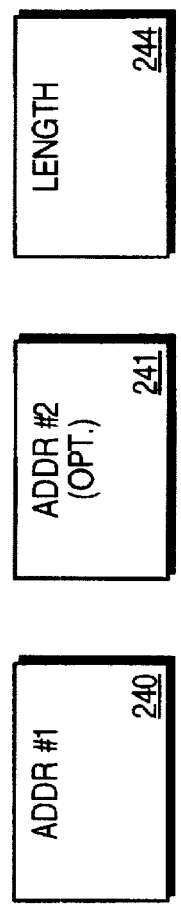
FIG. 6B illustrates a sequence of packets transmitted by a peripheral device during a read operation.

FIG. 6B illustrates a sequence of packets for performing a read operation on main memory 30. The peripheral device initiating the transfer sends a starting address packet 240 followed by a data packet 244 indicating the number of data words to be read from main memory 30, i.e., a "length packet" 244. An optional second address packet 241 may be transmitted following the starting address packet 240 and preceding the length packet 244 if more than 32-bit addressing is required. The length packet 244 may be followed by an "end-of-transfer" control packet 243, or the end-of-transfer condition may be implied in the length packet 244.

Referring once again to FIG. 4, the operation of the present invention will now be described. Peripheral devices which share the channel 214 will request use of the channel 214 by transmitting a "request" packet to the host controller 210. After a request packet has been sent by a peripheral device 50, that peripheral device may not transmit any other packets until it has received a "grant" packet from the host controller 210. Once the peripheral device 50 has received a grant packet, it may initiate the memory operation by transmitting a sequence of consecutive packets 230. Once the memory operation is complete, other peripheral devices sharing that channel may arbitrate for and send subsequent blocks of consecutive packets. Hence, multiple peripheral devices 50 may use a single channel 214 in the host controller 210.

Packets transmitted by a peripheral device 50 onto the HSSB 60 are deserialized by deserializer 215 and provided to the router 223. The router 223 identifies the proper channel for the requesting peripheral device and then provides the packets (without the device IDs) to the input buffer 221. The input buffer then outputs the packets to multiplexor 219. If the write input W of the multiplexor 219 is selected, the packets are passed through to the FIFO 220. Packets exiting the FIFO 220 are provided to the data buffer 217 and to the control circuit 212. The data buffer 217 and the control circuit 212 decode the packet-type bits 233 of each packet, such that data buffer 217 inputs only data packets, whereas control circuit 212 inputs only address and control packets. Selection of the read R and write W inputs of the multiplexor 219 is performed by the control circuit 212 based upon the state of the read/write bit 237 in the starting address packet. Data which is contained in data packets which is to be written to main memory 30 is provided by the data buffer 217 to main memory 30 via the memory interface 211 under the control of the control circuit 212. The control circuit 212 includes a state machine for performing memory read and write cycles, including logic for incrementing the current memory address by one DWord (4 bytes) after each bus cycle. The control circuit also includes a length register to store the number of DWords to be read from main memory 30 during a read operation, as indicated by the length packet 244.

When the read/write bit 237 indicates a read operation is to be performed, the control circuit 212 selects the read input R of the multiplexor 219 after the length packet is received and recognized. Data read from main memory 30 is loaded into the data buffer 217. The data is then output as data packets by the data buffer 217 to the read input R of the multiplexor 219 and loaded into the FIFO 220. Each data packet output by the data buffer 217 includes two packet-type bits identifying the packet as a data packet. After the last data packet has been loaded into the FIFO, the control circuit 212 signals the data buffer 217 to load a code representing the end-of-transfer condition into the FIFO. Data packets exiting the FIFO 220 during a read operation are provided to the router 223 via the output buffer 222. The router 223 recognizes the code representing the end-of-transfer and, in response, inserts an end-of-transfer control packet following the last data packet. In addition, the router 223, which has stored the device ID of the peripheral device that initiated the read operation, recombines the device ID with each outgoing data packet and outputs the resulting 41-bit data packets to the serializer 216. The outgoing packets are then serialized and placed onto the HSSB 60 by the serializer 216. The requesting peripheral device recognizes itself to be the destination of the outgoing data packets based on their device ID 231 and identifies the nature of the packets from their packet-type bits 233. After all data packets have been output by the FIFO 220 during a read operation, the control circuit 212 reselects the write W input of the multiplexor 219 to accept the next memory access request by a peripheral device.

As mentioned above, an optional second address packet 241 may follow a starting address packet 240 in order to provide greater than 32-bit addressing. Accordingly, the control circuit 212 includes an upper-order address register. The starting address packet 240 and the second address 241 are decoded by the control circuit 212 as a single memory address. A variable number of bits of the second address 241

(and, therefore, the upper-order address register) may be utilized, according to the particular requirements of the computer system 1. When a second address packet 241 is not used, the upper-order address register is cleared (set to zero).

The CPU 10 can also arbitrate for and program the channels 214. Programming by the CPU 10 may be used to send data to unidirectional (i.e., receive-only) devices, for example. The host controller 210 contains a set of shadow registers to allow the CPU 10 to arbitrate for and program the channels 214. To request use of a channel 214, the CPU 10 sets a bit in a request register and writes a device ID, starting address, and data length (number of DWords) into the appropriate shadow registers in the host controller 210. When the proper channel becomes idle, the contents of the shadow registers are loaded into the working registers of that channel, and the transfer proceeds.

Thus, in accordance with the present invention, the peripheral devices generate physical memory addresses for read and write operations on a memory, such that multiple peripheral devices can share a single DMA channel. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for enabling any of a plurality of peripheral devices to dynamically program read and write operations upon a memory, the apparatus comprising:

means for decoding a memory operation, the means for decoding including means for receiving a plurality of packets of information from one of the plurality of peripheral devices, one of the packets including a read/write bit identifying the memory operation as a read operation or a write operation, each of the packets being one of a plurality of packet types, the packet types including an address type, a data type and a control type, each of the packets including a plurality of packet type bits identifying the packet type of said packet as either the address type, the data type, or the control type, wherein the means for decoding decodes the memory operation based on said at least one packet type bit and the read/write bit; and means for performing the memory operation based on said at least one packet type bit and the read/write bit.

2. The apparatus of claim 1, wherein the packets include a starting address packet of the address type, the starting address packet including the read/write bit.

3. The apparatus of claim 2, wherein the starting address packet contains an address that is DWord-aligned.

4. The apparatus of claim 2, wherein the packets further comprise another packet of either the control type or the data type.

5. The apparatus of claim 2, wherein the packets further comprise a second address packet of the address type, such that addressing information contained within the starting address packet and the second address packet is decoded as a single memory address.

6. The apparatus of claim 1, wherein the step of establishing comprises the step of arbitrating between the peripheral devices.

7. The apparatus of claim 1, wherein during a read operation, the step of performing the memory operation comprises the step of using the controller to transmit a second plurality of packets from the controller to the peripheral devices, each of the second plurality of packets being one of the plurality of packet types, such that the current bus master decodes the second plurality of packets.

8. The apparatus of claim 1, wherein each of the peripheral devices has an identification code comprising a plurality of ID bits, wherein the identification code is included as part of one of the packets, such that the controller identifies the peripheral device initiating the memory operation based on the identification codes.

9. The apparatus of claim 8, wherein the identification codes of the peripheral devices are assigned contiguously from a $2^n$ boundary, where n is an integer, such that the controller can assign a channel to a peripheral device initiating the memory operation using less than all of the ID bits of each of the identification codes.

10. A direct memory access (DMA) channel for enabling a peripheral device to dynamically program a memory access operation upon a memory, the channel comprising:

a control circuit coupled to the memory, the control circuit receiving from the peripheral device a plurality of packets for performing the memory access operation, wherein the memory access operation is either a read operation or a write operation, the plurality of packets including a starting address packet and a subsequent packet, wherein the subsequent packet can be either a data packet data or a control packet, each of the plurality of packets including a plurality of packet type bits for identifying each of the packets as an address packet, a data packet, or a control packet, one of said plurality of packets including a read/write bit for identifying the memory access operation as either a read operation or a write operation, the control circuit recognizing the packets as address packets, data packets, or control packets based on the packet type bits, the control circuit controlling the memory access operation based on the starting address packet and the subsequent packet; and a storage device having a first input coupled to receive data read from the memory if the memory access operation is a read operation and a second input coupled to receive the packets received from the peripheral devices, the control circuit enabling either the first input or the second input based on the read/write bit, the storage device coupled to output the packets to the control circuit and to output the data read from the memory to the peripheral devices.

11. The DMA channel of claim 10, wherein the storage device comprises a first in-first out memory.

12. The DMA channel of claim 11, wherein the packets are transmitted from the peripheral device serially.

13. The DMA channel of claim 12, wherein the plurality of packets further comprise a second address packet, wherein the first address packet and the second address packet are decoded as one memory address.

14. The DMA channel of claim 10, wherein the address packet contains an address that is DWord-aligned.

15. The apparatus of claim 14, wherein the starting address packet contains an upper thirty (30) bits of a thirty-two (32) bit address.

16. The DMA channel of claim 10, wherein the packets are transmitted and received isochronously.

17. The DMA channel of claim 10, wherein the packets are transmitted and received asynchronously.

18. A controller for enabling a plurality of peripheral devices to dynamically program read and write operations upon a memory, the controller comprising:

a router coupled to receive from and transmit to the peripheral devices a plurality of packets of digital information for performing a plurality of memory operations, the plurality of packets including address packets, data packets, and control packets, each of the packets including a plurality of packet type bits for identifying each of the packets as either an address packet, a data packet, or a control packet, wherein each of the peripheral devices can initiate one of the memory operations by transmitting to the controller one of the address packets and a subsequent packet, wherein the subsequent packet is one of either the control packets or the data packets, wherein the address packet or the subsequent packet includes a read/write bit identifying the operation as a read operation or a write operation; and a channel coupled to the router and to the memory, the channel including:

a data buffer coupled to the memory, the data buffer storing data read from or to be written to the memory, the data buffer inputting data that is to be written to the memory and contained within the packets if the packet type bits of said packets indicate that said packets are data packets;

a control circuit coupled to the memory, the control circuit inputting information contained within the packets if the packet type bits of said packets indicate that said packets are address packets or control packets, the control unit recognizing the information within the address packets and the control packets as address information or control information, the control circuit controlling the read and write operations based on the address information and the control information;

a second buffer coupled to receive the packets from the router;

a third buffer coupled to provide to the router data read from the memory;

a multiplexor having a first input coupled to receive data read from the memory from the data buffer and a second input coupled to receive the packets from the second buffer, the control circuit selecting either the first input or the second input based on the read/write bit; and a first in-first out (FIFO) memory storing the packets and the data read from the memory, the FIFO memory having an input coupled to an output of the multiplexor and having an output coupled to provide the packets to the data buffer and to the control circuit, the output further coupled to provide data read from the memory to the third buffer.

19. The controller of claim 18, wherein the digital information is isochronous.

20. The controller of claim 18, wherein the digital information is asynchronous.

21. A computer system comprising:

a processor;

a memory coupled to the processor;

a plurality of peripheral devices coupled to the processor; and a controller coupled to the peripheral devices and to the memory the controller including:

a control circuit coupled to receive a plurality of packets transmitted from one of the peripheral devices, the packets for performing a memory access operation upon the memory, wherein the memory access operation is either a read operation or a write operation, each of the plurality of packets including a plurality of packet type bits for identifying each of the packets as an address packet, a data packet, or a control packet, one of said plurality of packets including a read/write bit for identifying the memory access operation as either a read operation or a write operation, the control circuit controlling the memory access operation based on the packet type bits and the read /write bit; and a storage device coupled to the control circuit, the storage device receiving the packets from said one of the peripheral devices, the storage circuit outputting address packets and control packets to the control circuit, the storage circuit outputting data contained in the data packets to the memory if the read/write bit indicates that the memory access operation is a write operation, the storage device receiving data read from the memory and outputting the data read from the memory to the peripheral devices if the memory access operation is a read operation.

22. The computer system of claim 21, wherein the plurality of packets including a starting address packet and a subsequent packet, wherein the subsequent packet can be either a data packet data or a control packet, wherein the control circuit further controls the memory access operation based on the starting address packet and the subsequent packet.

23. The computer system of claim 21, wherein the storage device comprises a first in-first out (FIFO) memory.

24. The computer system of claim 21, wherein the storage device further comprises a multiplexor having an output coupled to the FIFO memory and having a plurality of inputs, wherein the inputs are enabled or disabled by the control circuit based on the read/write bit.

25. The computer system of claim 21, further comprising a high-speed serial bus coupling the peripheral devices to the controller, such that the packets are transmitted from the peripheral device to the controller on the high-speed serial bus.

26. The computer system of claim 21, wherein the packets are communicated asynchronously.

27. The computer system of claim 21, wherein the packets are communicated isochronously.

28. A method of enabling any of a plurality of peripheral devices to dynamically program read and write operations upon a memory, the method comprising the steps of:

establishing one of the peripheral devices as a current bus master;

initiating a memory operation by transmitting a plurality of packets of information from the current bus master to a controller providing an interface with the memory, one of said packets including a read/write bit identifying the operation as a read operation or a write operation, each of the packets being one of a plurality of packet types, each of the packets including a plurality of packet type bits identifying the packet type of said packet, the plurality of packet types including an address type for conveying address information, a data type for conveying data, and a control type for conveying control information;

ascertaining the memory operation using the controller based on the packet type bits and the read/write bit; and performing the memory operation using the controller.

29. The method of claim 28, wherein the packets comprise a first packet of the address type.

30. The method of claim 29, wherein the first packet includes the read/write bit.

31. The method of claim 29, wherein the packets further comprise a second packet of the address type, such that the address information contained within the first packet and the address information contained within the second packet are decoded into a single memory address.

32. The method of claim 29, wherein the packets further comprise a subsequent packet of either the control type or the data type.

33. The method of claim 28, wherein the step of establishing comprises the step of arbitrating between the peripheral devices.

34. The method of claim 28, wherein the step of performing the memory operation comprises the step of using the controller to transmit a second plurality of packets from the controller to the peripheral devices, wherein the current bus master decodes the second plurality of packet.

35. The method of claim 28, wherein, in the initiating step, the packets are communicated asynchronously.

36. The method of claim 28, wherein, in the initiating step, the packets are communicated isochronously.

37. An apparatus for enabling any of a plurality of peripheral devices to dynamically program read and write operations upon a memory, the apparatus comprising:

a storage device coupled to receive from one of the peripheral devices a plurality of packets for performing the memory access operation and coupled to receive data read from the memory when the memory access operation is a read operation, each of the packets being wherein the packet types types, wherein the packet types comprise an address type, a data type, and a control type, each of the packets including a plurality of bits for identifying the packet type of each packet as being of either the address type, the data type, or the control type, one of the packets including at least one operation identifier bit for identifying the type of memory access operation; and control circuitry coupled to the storage device, the control circuitry decoding and controlling the memory operation based on the plurality of bits for identifying the packet type and the at least one operation identifier bit.

38. The apparatus of claim 37, wherein the packets include a starting address packet of the address type and a subsequent address packet of the data type or the control type, the starting address packet including the read/write bit.

39. The apparatus of claim 37, wherein the starting address packet contains an address that is DWord-aligned.

40. The apparatus of claim 37, wherein the packets further comprise a second address packet of the address type, such that addressing information contained within the starting address packet and the second address packet is decoded as a single memory address.

41. The apparatus of claim 37, wherein each of the peripheral devices has an identification code comprising a plurality of ID bits, wherein the identification code is included as part of one of the packets, such that the controller identifies the peripheral device initiating the memory operation based on the identification codes.

42. A device for enabling a peripheral device to dynamically program a memory access operation upon a memory, the device comprising:

a memory interface coupled to the memory;

a plurality of direct memory access (DMA) channels coupled to the memory interface, each of the DMA channels including:

a control circuit coupled to the memory interface, the control circuit receiving a plurality of packets of digital information from any of a plurality of peripheral devices, the plurality of packets for performing read and write operations upon the memory, the plurality of packets including address packets, data packets, and control packets, each of the plurality of packets including a plurality of packet type bits for identifying each packet as an address packet, a data packet, or a control packet, the control circuit recognizing each packet as an address packet, a data packet, or a control packet based on the packet type bits and controlling the memory access operation based on the packets, such that one of the plurality of peripheral devices can initiate a memory operation by transmitting an address packet and a subsequent packet, wherein the subsequent packet can be either a control packet or a data packet, wherein the address packet or the subsequent packet includes a read/write bit identifying the memory access operation as a read operation or a write operation; and a first-in/first-out (FIFO) storage device coupled to the control circuit, the FIFO storage device having a plurality of multiplexed inputs including a first multiplexed input coupled to input data received from the memory when the memory access operation is a read operation and a second multiplexed input coupled to input the plurality of packets received from said one of the peripheral devices, the control circuit selecting one of the plurality of multiplexed inputs based on the read/write bit, wherein the FIFO storage device is coupled to output the packets to the control circuit and to output data read from the memory to said one of the peripheral devices; and a router coupled to receive the plurality of data packets from the peripheral device and coupled to receive data read from the memory, wherein the router selects one of the DMA channels based on a device identifier associated with one of the plurality of packets and forwards the plurality of packets to the selected DMA channel, and wherein the router forwards data read from the memory to said one of the peripheral devices.

43. The device of claim 42, wherein the plurality of packets are transmitted from said one of the peripheral devices on a high-speed serial bus.

44. The device of claim 43, wherein the packets are transmitted and received asynchronously.

45. The device of claim 43, wherein the packets are transmitted and received isochronously.

46. In a controller coupled to a plurality of peripheral devices by a bus and coupled to a memory, the controller including a plurality of direct memory access (DMA) channels, a method of enabling any of the plurality of peripheral devices to dynamically program read and write operations upon the memory, the method comprising the steps of:

receiving from one of the plurality of peripheral devices a plurality of packets of information for performing a memory operation, each of the packets being one of a plurality of packet types, the plurality of packet types including an address type, a data type, and a control type, each of the packets including a plurality of packet type bits for identifying each packet as an address type, a data type, or a control type, wherein the plurality of packets received from the current bus master include a starting address packet and a subsequent packet, wherein the subsequent packet can be of either the data type or the control type, one of the plurality of packets including a read/write bit identifying the operation as a read operation or a write operation, at least one of the plurality of packets having a device identifier for identifying said one of the peripheral devices;

selecting one of the plurality of DMA channels based on the device identifier;

forwarding the plurality of packets to the selected DMA channel;

identifying the memory operation as either a read operation or a write operation based on the read/write bit;

identifying the packet types of the plurality of packets based on said at least one packet type bit; and performing the memory operation based on a content of the starting address packet and the subsequent packet.

47. The method of claim 46, wherein the plurality of packets comprise a second packet of the address type, such that the address information contained within the starting address packet and the address information contained within the second packet are decoded into a single memory address.

48. The method of claim 46, wherein the receiving step comprises the step of receiving asynchronously transmitted packets.

49. The method of claim 46, wherein the receiving step comprises the step of receiving isochronously transmitted packets.

* * * * *